UNITED STATES PATENT OFFICE.

FREDERICK E. WOODWARD, OF LACHINE, QUEBEC, CANADA.

SHOE-FILLER.

1,136,457.  Specification of Letters Patent.  Patented Apr. 20, 1915.

No Drawing.  Application filed August 8, 1913.  Serial No. 783,794.

*To all whom it may concern:*

Be it known that I, FREDERICK E. WOODWARD, a citizen of the United States of America, and residing at No. 577 St. Joseph street, Lachine, Province of Quebec, Dominion of Canada, have invented certain new and useful Improvements in Shoe-Fillers, of which the following is a specification.

The invention to be hereinafter described relates to shoe fillers.

The main objects of the invention are to provide a marketable, transportable filler which will be economical in its production and use and will have the following qualities; permanent pliability, durability, waterproofness, elasticity, resiliency, softness and workability, strongly adherent to leather whether wet or dry, tenacious, low melting, quick cooling, rapid setting and stable or non shifting.

At present there are two classes of fillers on the market—rubber cement fillers, and ground cork fillers. Neither of these adequately meets the demands. The first is dangerous from fire and is wasteful and expensive because of evaporation, while the second requires a long time to set, involving long and expensive delays in the other steps of manufacture.

To fully and adequately meet all of the requirements herein-before enumerated the present filler has been invented. It comprises the ingredients hereinafter stated, and mixed substantially in the manner and proportions set forth in the following description. Preferably, what will be hereinafter termed the compound, is first made. This compound, which also performs the function of a binder, is then mixed with a base of ground or granulated cork, saw-dust, leather dust, or any suitable substance of like nature.

The preparation of the above filler is as follows:—250 lbs. of resin is heated to the melting point in a steam jacketed kettle or other suitable vessel. While it is in a hot fluid state 30 lbs. of vaseline and 20 lbs. of pine tar are stirred in. The vaseline acts on the resin to render the resulting mass soft, semi-plastic, flexible, resilient, elastic, non-brittle, pliable, waterproof, stable, tough, tenacious, adhesive, readily workable, low melting, quick cooling, and rapid setting. The resin alone, upon cooling, would become hard and brittle, of course. The pine tar increases the working qualities of the filler so that it will smooth off better and give a neater appearance when molded into the shoe cavity. Also, before mixing in the vaseline of the compound, 10 lbs. of bi-carbonate of soda should be added and thoroughly dissolved. The bi-carbonate of soda makes the resulting filler substantially non-inflammable. Into this hot compound above described is stirred the base material of granulated cork, saw-dust, leather dust, or other suitable material having the same general qualities in the proportion of 25 lbs. base to 6 gals. compound. This completes the filler. When allowed to cool it is ready for use. If desired, it may be put up in loaf form by covering the outside of each loaf with a layer of the base material in well known manner, or it may be put up in barrels or boxes. The heated compound and consequently, the filler containing it, gives off a non-inflammable gas, thus substantially preventing combustion of the filler. Thus, in addition to the qualities previously enumerated, this filler has the additional qualities of non-inflammableness and smoothness and evenness in working when being molded into the cavity.

The ingredients above named are common trade articles and, therefore, vary more or less in purity. Consequently, their proportions will vary somewhat, on that account. Likewise, the requirements of the filler for use in summer are different than the requirements for winter. For that reason, the proportions will be varied. Thus, for winter use, for instance, there would be a greater quantity of vaseline than for summer use.

Obviously, other ingredients having either individually or collectively, similar properties may be used for those specifically mentioned. Many of these are well known on the market and would readily occur to any one skilled in the art to which this invention relates. Therefore, they need not be set forth here.

Having fully set forth and described my invention, what I claim and desire to protect by Letters Patent of the United States is:—

1. A shoe filler comprising, resin, vaseline, pine tar, bi-carbonate of soda, and a comminuted resilient solid material.

2. A shoe filler comprising, resin 250 lbs. vaseline 30 lbs. pine tar 20 lbs. bi-carbonate of soda 10 lbs. and a comminuted resilient solid material.

3. A shoe filler comprising, resin 250 lbs. vaseline 30 lbs. pine tar 20 lbs. bi-carbonate of soda 10 lbs. and 25 lbs. of comminuted resilient solid material to 6 gals. of said mixture.

FREDERICK E. WOODWARD.

Witnesses:
GEORGE H. CROSS,
RICHARD E. WOODWARD.